UNITED STATES PATENT OFFICE.

GEORGE F. ARMSTRONG, OF NEWARK, NEW JERSEY.

PLASTIC COMPOSITION.

1,257,780.  Specification of Letters Patent.  Patented Feb. 26, 1918.

No Drawing.  Application filed October 31, 1917.  Serial No. 199,487.

*To all whom it may concern:*

Be it known that I, GEORGE F. ARMSTRONG, a citizen of the United States, and a resident of Newark, in the county of Essex and State of New Jersey, have invented a new and Improved Plastic Composition, of which the following is a full, clear, and exact description.

My composition of matter relates to a plastic mass which is used in pneumatic tubes to automatically fill openings that may be caused by puncture, thereby rendering the pneumatic self-healing, the compressed air within the pneumatic facilitating the healing of the tube by the plastic mass.

Another object of the invention is to provide a plastic mass which is viscous and adapted to remain in its original state for an indefinite period of time, not being affected by the atmosphere.

The plastic mass is formed of crude rubber (preferably guayule), rubber substitute in powdered form, and oil of rosin in the following proportions: 70% of crude rubber and 30% of rubber substitute, and for each 100 parts by weight of the above mixture two and one-half pounds of oil is added. The rubber substitute is made from vegetable oils, preferably rape, and sulfur chlorid.

The crude rubber and the rubber substitute are thoroughly mixed on a rubber mill and then the oil is added thereto. The resulting product is a viscous mass which has sufficient fluidity to easily penetrate an opening that may be formed in a tube by a nail or a similar article when puncturing a tube. The plastic mass will stick about the nail and prevent the air in the tube from escaping along the nail, and if the nail is withdrawn it will immediately fill the opening and automatically heal the tube.

The presence of oil of rosin in the composition facilitates the sticking of same to nails or glass while they engage the body of the tube and thereby prevents the air in the pneumatic from escaping along the object. The presence of rosin also increases the binding quality of the composition, which is important in cuts or punctures of large proportions. For healing punctures in tubes of small size, such as bicycles, the oil of rosin can be dispensed with.

The term "rubber substitute" is employed for the substance previously mentioned, and is used as such in the claim.

I claim:

A plastic composition for healing punctures in pneumatic tubes, consisting of crude rubber and rubber substitute interground in proportions substantially as specified and mixed with oil of rosin in proportions substantially as specified.

GEORGE F. ARMSTRONG.